United States Patent
Long et al.

(10) Patent No.: US 9,731,827 B2
(45) Date of Patent: *Aug. 15, 2017

(54) OVERHEAD STORAGE BIN LATCH SYSTEM

(71) Applicant: C&D ZODIAC, INC., Huntington Beach, CA (US)

(72) Inventors: Eric Long, Huntington Beach, CA (US); Stephen Kearsey, Huntington Beach, CA (US); Scott Savian, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,178

(22) Filed: Nov. 18, 2016

(65) Prior Publication Data

US 2017/0066533 A1 Mar. 9, 2017

Related U.S. Application Data

(63) Continuation-in-part of application No. 14/923,905, filed on Oct. 27, 2015, now Pat. No. 9,499,272, and
(Continued)

(51) Int. Cl.
*B64D 11/00* (2006.01)
*E05B 53/00* (2006.01)
(Continued)

(52) U.S. Cl.
CPC ........ *B64D 11/003* (2013.01); *B64D 11/0015* (2013.01); *E05B 5/00* (2013.01);
(Continued)

(58) Field of Classification Search
CPC ..... B64D 11/003; B62D 33/071; E02F 9/166; Y10T 292/0848; Y10T 292/0849;
(Continued)

(56) References Cited

U.S. PATENT DOCUMENTS 197,115 A 11/1877 Frees
1,754,889 A 4/1930 Halinka
(Continued)

FOREIGN PATENT DOCUMENTS

AT DE 202014101793 U1 * 5/2014 .......... B64D 11/003
CA 2796834 10/2011
(Continued)

OTHER PUBLICATIONS

CA 2859823 Office Action dated Jul. 9, 2015.
(Continued)

*Primary Examiner* — Tien Dinh
*Assistant Examiner* — Alexander V Giczy
(74) *Attorney, Agent, or Firm* — Jeffer Mangels Butler & Mitchell LLP; Brennan C. Swain, Esq.

(57) ABSTRACT

A aircraft storage bin latch system that includes a paddle button assembly having a button that is movable between home and actuation positions, a latch assembly that includes a striker assembly with a striker and a hook assembly, and a cable that extends between the paddle button assembly and the latch assembly. The hook assembly includes a hook, a pivotal trigger arm, and an indicator that is movable between first and second positions when the trigger arm is moved from an engaged position to a disengaged position. Movement of the button from the home position to the actuation position pushes or pulls the cable, thereby pivoting the trigger arm from the engaged position to the disengaged position and disengaging the hook from the striker. Pivotal movement of the trigger arm from the engaged position to the disengaged position results in linear movement of the indicator from the first position to the second position.

19 Claims, 15 Drawing Sheets

Related U.S. Application Data a continuation-in-part of application No. 14/796,829, filed on Jul. 10, 2015.

(60) Provisional application No. 62/069,163, filed on Oct. 27, 2014.

(51) Int. Cl.
| | |
|---|---|
| *E05C 9/00* | (2006.01) |
| *E05C 3/24* | (2006.01) |
| *E05B 41/00* | (2006.01) |
| *E05B 5/00* | (2006.01) |
| *E05B 65/00* | (2006.01) |
| *E05C 1/12* | (2006.01) |
| *E05C 19/00* | (2006.01) |

(52) U.S. Cl.
CPC .............. *E05B 41/00* (2013.01); *E05B 53/00* (2013.01); *E05B 53/003* (2013.01); *E05B 53/005* (2013.01); *E05B 65/006* (2013.01); *E05C 1/12* (2013.01); *E05C 3/24* (2013.01); *E05C 9/00* (2013.01); *E05C 19/00* (2013.01); *B64D 2011/0038* (2013.01); *Y10S 292/37* (2013.01)

(58) Field of Classification Search
CPC ......... Y10T 292/0855; Y10T 292/0911; Y10T 292/0931; Y10T 292/0945; Y10T 292/0926; Y10T 292/0928; Y10T 292/1043; Y10T 292/1051; Y10T 292/1052; Y10T 292/1057; Y10T 292/1075; Y10T 292/1076; Y10S 292/37; E05C 3/162; E05C 3/24; E05C 3/26; E05C 3/38; E05C 3/40; E05C 9/00; E05B 5/00; E05B 53/00; E05B 53/003; E05B 53/005; E05B 83/247; E05B 63/14; B60R 7/04; B60R 2011/0028; B60R 11/00
USPC ............. 296/190.06; 280/783; 220/326, 324, 220/4.23, 4.22, 4.21
See application file for complete search history.

(56) References Cited

U.S. PATENT DOCUMENTS

| | | | |
|---|---|---|---|
| 2,379,810 A * | 7/1945 | Ledin | ............... E05B 55/00 292/169 |
| 2,924,473 A | 2/1960 | Krause | |
| 3,080,743 A | 3/1963 | Stansberry | |
| 4,266,816 A * | 5/1981 | Mukai | ............... E05B 79/20 292/125 |
| 4,456,289 A | 6/1984 | Badiali | |
| 4,526,057 A | 7/1985 | Mochida | |
| 4,544,189 A | 10/1985 | Fiordellisi | |
| 4,633,724 A | 1/1987 | Mochida | |
| 4,691,584 A | 9/1987 | Takaishi | |
| 4,917,420 A | 4/1990 | Rogers, Jr. | |
| 5,531,489 A | 7/1996 | Cetnar | |
| 6,026,705 A | 2/2000 | Ficyk | |
| 6,092,845 A | 7/2000 | Koenig | |
| 6,135,514 A | 10/2000 | Kowalewski | |
| 6,309,008 B1 | 10/2001 | Bacon | |
| 6,427,500 B1 | 8/2002 | Weinerman | |
| 6,471,263 B1 | 10/2002 | Choo | |
| 6,547,291 B1 | 4/2003 | Schwaiger | |
| 6,746,073 B2 | 6/2004 | Heller | |
| 6,896,302 B2 | 5/2005 | Belchine, III | |
| 7,040,675 B1 | 5/2006 | Ott | |
| 7,073,220 B2 * | 7/2006 | Simmonds | ........... A47C 19/045 292/36 |
| 7,261,328 B2 | 8/2007 | Minix | |
| 7,552,954 B2 | 6/2009 | Rozo | |
| 7,775,566 B2 * | 8/2010 | Hanjono | ................... B60R 7/06 292/202 |
| 7,802,826 B2 | 9/2010 | Schmitz | |
| 7,857,362 B2 | 12/2010 | Deblock | |
| 8,029,029 B2 | 10/2011 | Terhaar | |
| 8,376,478 B2 | 2/2013 | Weber | |
| 8,480,029 B2 | 7/2013 | Young | |
| 8,534,718 B2 | 9/2013 | Loret De Mola | |
| 8,708,377 B2 | 4/2014 | Ishikawa | |
| 8,770,515 B1 | 7/2014 | Cloud | |
| 8,876,174 B2 | 11/2014 | Motherwell | |
| 8,939,473 B2 | 1/2015 | Costabel | |
| 9,188,143 B1 | 11/2015 | Motherwell | |
| 9,499,272 B2 * | 11/2016 | Kearsey | ............ B64D 11/0015 |
| 2006/0033345 A1 * | 2/2006 | Richardson | ............. E05B 63/20 292/175 |
| 2007/0013202 A1 | 1/2007 | Tompson | |
| 2007/0152484 A1 * | 7/2007 | Palomba | .................. E05C 3/24 297/336 |
| 2008/0191498 A1 * | 8/2008 | Schmitz | ................ E05B 13/004 292/216 |
| 2010/0244465 A1 * | 9/2010 | de Mola | .................. E05B 5/00 292/164 |
| 2011/0253837 A1 * | 10/2011 | Lee | ..................... B64D 11/003 244/118.5 |
| 2012/0248790 A1 * | 10/2012 | Costabel | ................ E05B 41/00 292/96 |
| 2014/0152162 A1 * | 6/2014 | Hashberger | .......... B64D 11/003 312/327 |
| 2014/0197721 A1 | 7/2014 | Savian | |
| 2015/0175321 A1 | 6/2015 | Weber | |
| 2015/0307192 A1 | 10/2015 | Savian | |
| 2016/0010361 A1 * | 1/2016 | Smith | ..................... E05B 41/00 70/91 |

FOREIGN PATENT DOCUMENTS

| | | | |
|---|---|---|---|
| CH | DE 102010016313 A1 * | 10/2011 | ........... B64D 11/003 |
| DE | 29503953 | 5/1995 | |
| EP | 0606922 | 7/1994 | |
| EP | 2937285 | 10/2015 | |
| WO | 8502645 | 6/1985 | |
| WO | 2010004039 | 1/2010 | |

OTHER PUBLICATIONS

PCT/US15/57513 International Search Report & Written Opinion dated Jan. 19, 2016.
International Search Report and Written Opinion dated Feb. 2, 2017 in PCT/US2016/062897.

* cited by examiner

OVERHEAD STORAGE BIN LATCH SYSTEM

CROSS REFERENCE TO RELATED APPLICATIONS

This application is a continuation-in-part of U.S. patent application Ser. No. 14/923,905, filed Oct. 27, 2015, which claims the benefit of U.S. Provisional Application No. 62/069,163, filed Oct. 27, 2014. U.S. patent application Ser. No. 14/923,905 is also a continuation-in-part of U.S. patent application Ser. No. 14/796,829, filed Jul. 10, 2015. All of the above listed applications are incorporated by reference herein in their entireties.

FIELD OF THE INVENTION

The present invention relates generally to a latch system, and more particularly to a latch system for an aircraft overhead storage bin.

BACKGROUND OF THE INVENTION

Overhead storage bins in aircraft typically include latching systems to secure the pivotal bucket to the upper housing. However, many latch systems have proven unreliable. Accordingly, a need exists for an improved latch system. U.S. Patent Publication Nos. 2014/0197721 and 2015/0307192 are incorporated by reference herein in their entireties.

SUMMARY OF THE PREFERRED EMBODIMENTS

In accordance with a first aspect of the present invention there is provided an aircraft storage bin that includes an upper housing that includes first and second side panels, a bucket that cooperates with the upper housing to define a bin interior, and a latch system. The bucket is movable with respect to the upper housing between an open position and a closed position and includes a bottom and first and second side walls. The latch system includes a paddle button assembly having a button that is movable between a home position and an actuation position, a first latch assembly that includes a first hook assembly and a first striker assembly, and a first cable that extends between the paddle button assembly and the first latch assembly. The paddle button assembly is associated with one of the bucket and the upper housing. The first hook assembly is associated with one of the bucket and the upper housing and the first striker assembly is associated with the other of the bucket and the upper housing. Movement of the button from the home position to the actuation position moves the first cable, thereby disengaging the first hook assembly and the first striker assembly, thereby causing the bucket to move from the closed position to the open position. In a preferred embodiment, the first hook assembly includes a first hook and the first striker assembly includes a first striker. Movement of the first cable moves one of the first hook and the first striker to disengage the first hook assembly and the first striker assembly. Preferably, the button is pivotal between the home position and the actuation position and the pivotal movement of the button pushes or pulls the first cable, thereby pivoting a first trigger arm from an engaged position to a disengaged position and disengaging the first hook from the first striker.

In a preferred embodiment, the first hook assembly includes a first rotary member that includes the first hook. The first rotary member is movable between a first position where the first hook is engaged with the first striker and a second position where the first hook is not engaged with the first striker. Preferably, the first rotary member is biased toward the second position. In a preferred embodiment, the first rotary member includes a first catch member that engages a first ledge on the first trigger arm in the first position and a first stop member in the second position. The first rotary member is preferably enclosed in a housing and includes a first closeout member. The housing includes a striker opening defined in a top wall thereof and the first closeout member is positioned to block the striker opening when the rotary catch is in the second position.

In a preferred embodiment, the hook assembly includes an indicator that is movable from a first position to a second position when the trigger arm is moved from the engaged position to the disengaged position. Preferably, the indicator is enclosed in a housing and extends outwardly from the housing when in the second position. In a preferred embodiment, the button is pivotal between the home position and the actuation position, and pivoting of the button pivots a cam member that pushes or pulls the cable, thereby disengaging the hook from the striker. Preferably, the cam member includes a cam post extending outwardly therefrom that engages a cam surface on the button, and the cam post moves along the cam surface when the button pivots from the home position to the actuation position.

In accordance with another aspect of the present invention there is provided a method of closing a storage bin that includes the steps of moving a bucket from an open position to a closed position and toward an upper housing. One of the bucket and the upper housing includes a hook assembly and the other of the bucket and the striker includes a striker assembly. The hook assembly includes a rotary member that includes a hook and a closeout member, and the striker assembly includes a striker. The rotary member is movable between a first position where the hook is engaged with the striker and a second position where the hook is not engaged with the striker. The step of moving the bucket from the open position to the closed position causes the striker to contact the closeout member, thereby rotating the hook from the second position to the first position.

In a preferred embodiment, the first paddle button assembly includes a first indicator that is movable from a first position to a second position when the button is moved from the home position to the actuation position. Preferably, the first paddle button assembly includes a first indicator that is movable from a first position to a second position when the button is moved from the home position to the actuation position and the first hook maintains the first trigger arm in the disengaged position when the first rotary member is in the second position, thereby maintaining the indicator in the second position.

In accordance with another embodiment of the present invention there is provided a latch system that includes a paddle button assembly having a button that is movable between a home position and an actuation position, a first latch assembly that includes a first striker assembly and a first hook assembly, and a first cable that extends between the paddle button assembly and the first latch assembly. Movement of the button from the home position to the actuation position moves the first cable, thereby disengaging the first hook assembly and the first striker assembly. Preferably, the button is pivotal between the home position and the actuation position and the pivoting of the button pivots a first cam member that pushes or pulls the first cable, thereby disengaging the first hook from the first striker.

In accordance with another aspect of the present invention there is provided a method of opening a storage bin that includes moving a button from a home position to an actuation position. Movement of the button from the home position to the actuation position moves a first cable, thereby disengaging a first hook assembly and a first striker assembly, wherein a bucket moves from a closed position to an open position. The method also includes maintaining an indicator in an indication position when a first latch assembly is engaged and a second latch assembly is disengaged.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
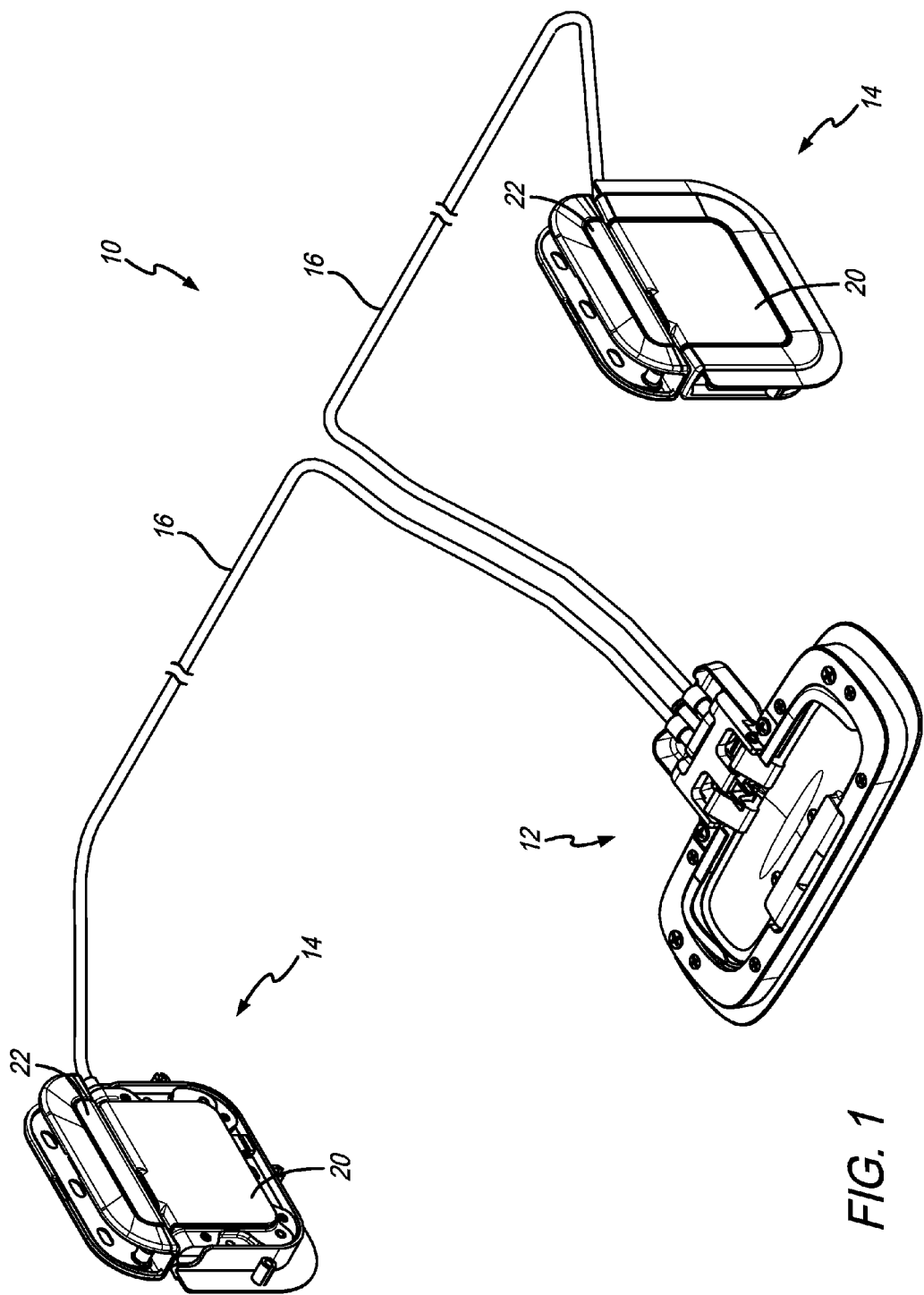
FIG. 1 is a perspective view of a latch system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the—disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
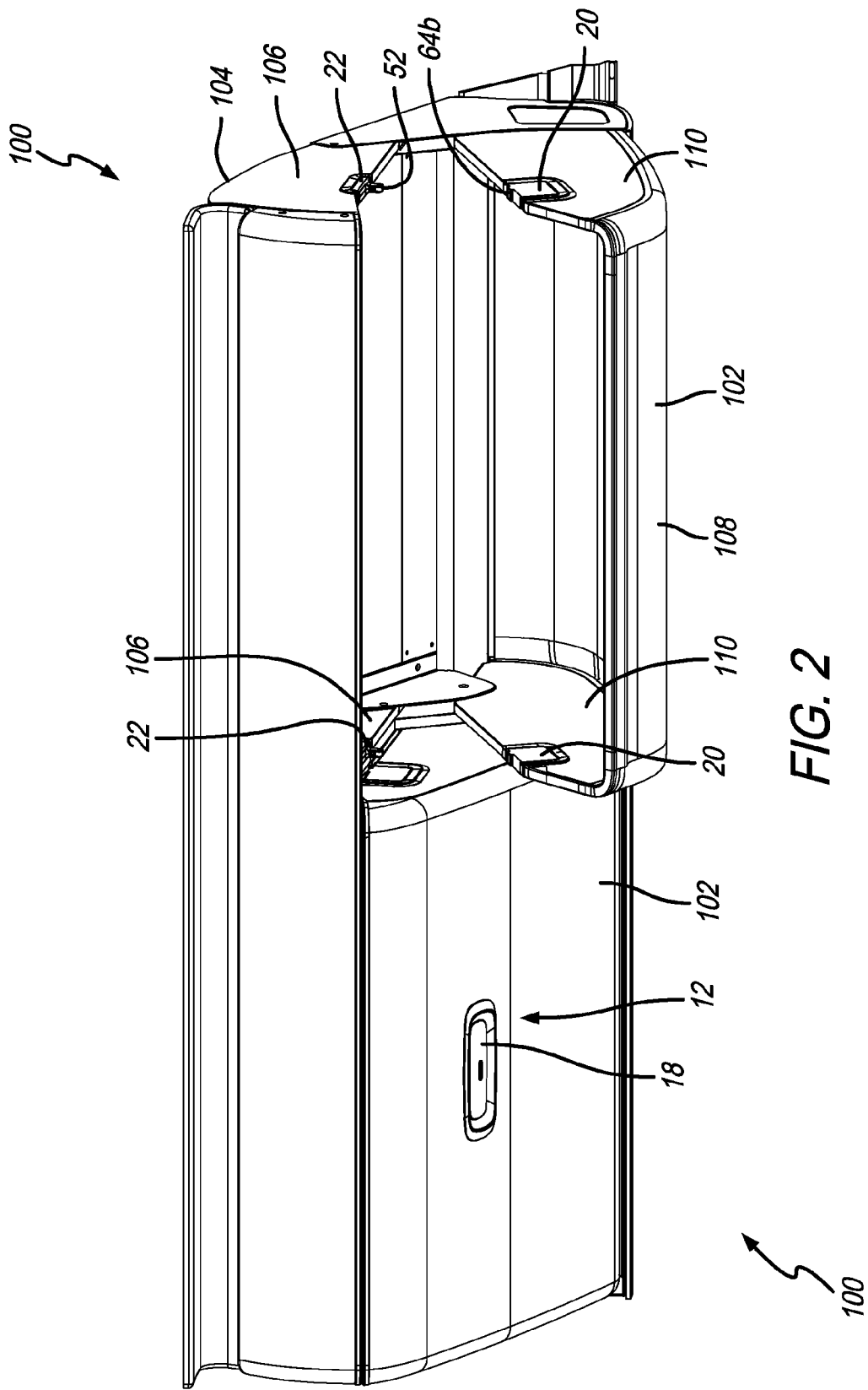
FIG. 2 is a perspective view of a dual pivot bin assembly with the latch system of FIG. 1 incorporated therein.

Referring now to the drawings, wherein the showings are for purposes of illustrating the present invention and not for purposes of limiting the same, FIGS. 1-9B show an embodiment of a latch system 10. However, this is not a limitation on the present invention and the latch system 10 can be used elsewhere. As shown in FIG. 1, generally, the latch system 10 includes a paddle button assembly 12, first and second latch assemblies 14 and first and second cables 16 extending between the paddle button assembly 12 and the first and second latch assemblies 14. As shown in FIG. 2, the latch system 10 can be used with a pivot bin assembly 100, such as those used in commercial passenger aircraft. However, this is not a limitation on the present invention and the latch system 10 can be used elsewhere. Preferably, the latch system 10 is used with an aircraft storage bin 100 that includes a bucket 102 that is pivotally connected to an upper housing 104. Preferably, the upper housing 104 includes first and second side panels 106. The bucket 102 cooperates with the upper housing to define a bin interior and is movable with respect to the upper housing 104 between an open position and a closed position. In a preferred embodiment, the bucket 102 includes a bottom 108 and first and second side walls 110. In another embodiment, the bucket can also include a top. For example, see the bucket taught in U.S. Patent Publication No. 2011/0253837, published on Oct. 20, 2011 (the "'837 publication"), the entirety of which is incorporated by reference herein.

As shown in FIG. 1, the paddle button assembly 12 includes a button 18 that is movable between a home position and an actuation position (see FIGS. 5A and 5B), the first and second latch assemblies 14 includes a first hook assembly 20 and a first striker assembly 22, and the first and second cables 16 extends between the paddle button assembly 12 and the first and second latch assemblies 14. The first and second latch assemblies 14 can be associated with the side panels and side walls of the upper housing 104 and bucket 102 or they can be associated with the front of the upper housing 104 and bucket 102. It will be appreciated that only a single latch assembly 14 can be utilized (on one side or in the middle of the bucket and upper housing).

As shown in FIG. 2, in a preferred embodiment, the paddle button assembly 12 is associated with or mounted on or in the bucket 102. However, in another embodiment, the paddle button assembly 12 can be associated with or mounted on or in the upper housing. In a preferred embodiment, the first and second hook assemblies 20 are associated with one of the bucket 102 and the upper housing 104 and the first and second striker assemblies 22 are associated with the other of the bucket 102 and the upper housing 104. The drawings show the hook assemblies 20 mounted in the side walls 110 of the bucket 102 and the striker assemblies 22 mounted in and extending downwardly from the side panels 106 of the upper housing 104. However, this arrangement can be reversed. In the embodiment shown in the drawings, the hook and striker assemblies 20 and 22 are generally aligned with the side walls and side panels, which allows the clamshell type bin to close. However, in another embodiment, the hook and striker assemblies 20 and 22 can be mounted on the inside of outside of the side walls or side panels. For example, if the latch system 10 was used with the pivot bin assembly taught in the '837 publication, the striker assemblies 142 could be mounted on the inner surfaces the side panels of the stationary upper housing and the hook assemblies 140 could be mounted on the outer surfaces of the side walls of the pivoting bin or vice versa.

Generally, movement of the button 138 from the home position (see FIG. 14A) to the actuation position (see FIG. 14B) moves the cables 16, thereby disengaging the hook assemblies 140 and the striker assemblies 142, thereby allowing the bucket to move from the closed position to the open position. This arrangement will be further described below.

Figure 3:
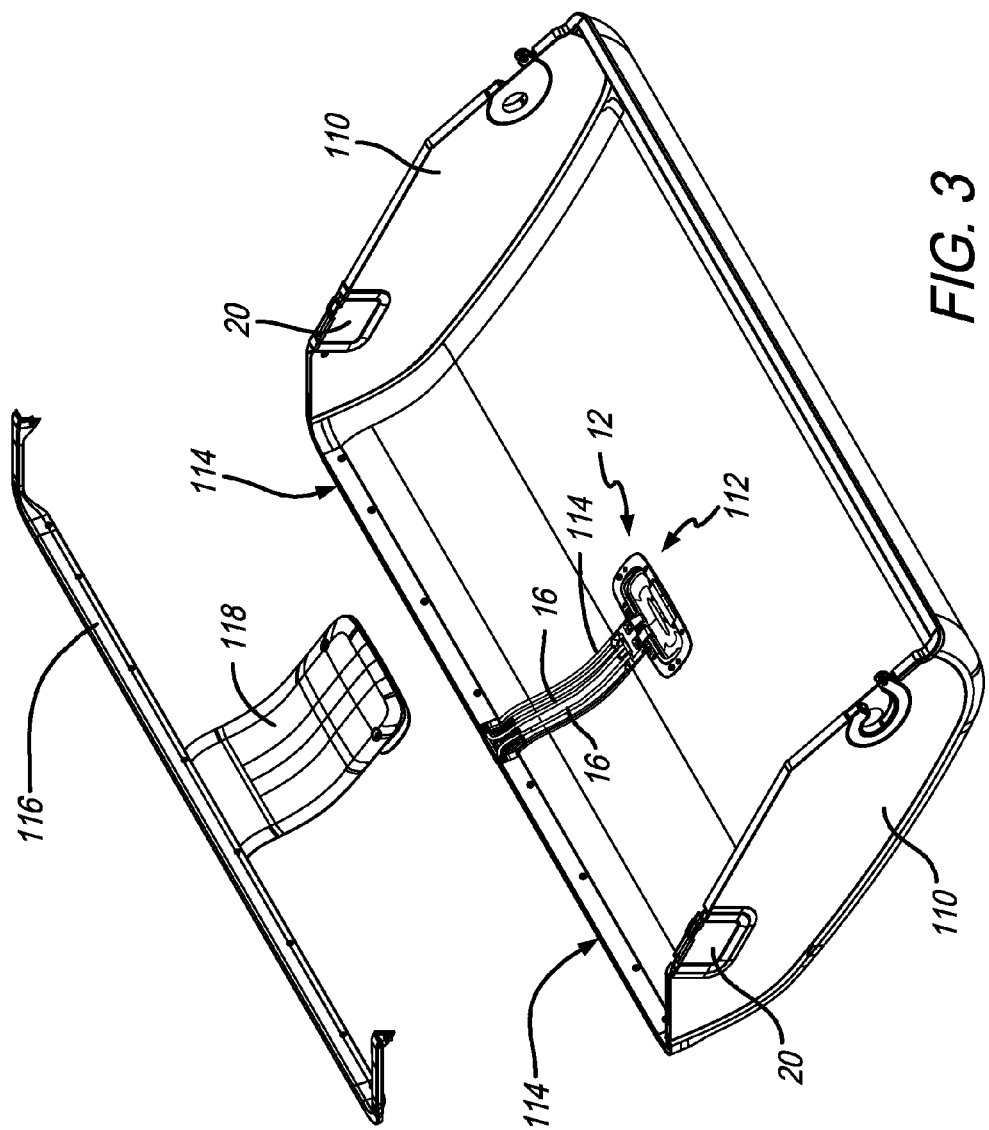
FIG. 3 is a perspective view of the bucket of the a dual pivot bin assembly with the latch system of FIG. 1 incorporated therein.
Figure 12:
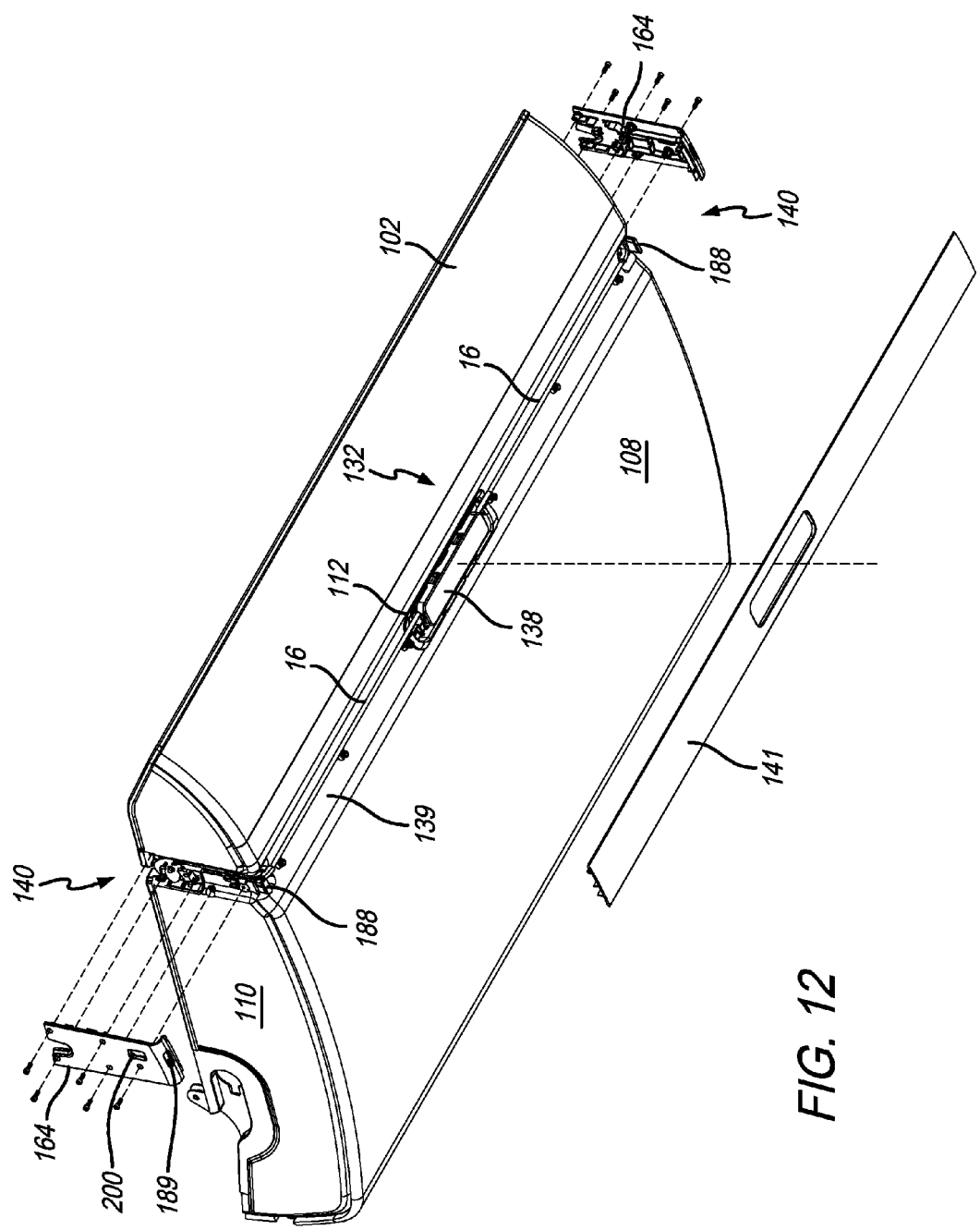
FIG. 12 is a perspective view of the bucket of the dual pivot bin assembly with the latch system of FIG. 10 incorporated therein.

As shown in FIG. 12, in a preferred embodiment, paddle button assembly 132 is mounted in an opening 112 defined in the bottom 108 of the bucket 102. The cables 16 extend through a channel 114 defined in either the bucket 102, between the bucket 102 and trim 116 or in the trim. FIG. 3 shows the first portion of the channel 114 extending away from the paddle button assembly 12 defined in the bucket and covered by a cover 118 (which is exploded away) and the second portion of the channel 114 defined in the top of the front and side edges of the bucket 102 and to the striker assemblies 22. In another embodiment, the first portion of the channel 114 extends away from the paddle button assembly 12 and is defined in the bucket and covered by the cover 118 and the second portion of the channel 114 is defined between the top of the front and side edges of the bucket 102 and the inner surface of the trim 116. The cables 16 can be exposed or contained in an outer casing 17, similar to cables used for braking on bicycles. The bucket 102 can also includes the cover 118 that is mounted to an inside surface thereof for covering the paddle button assembly 12, cables 16 and associated components.

Figure 4:
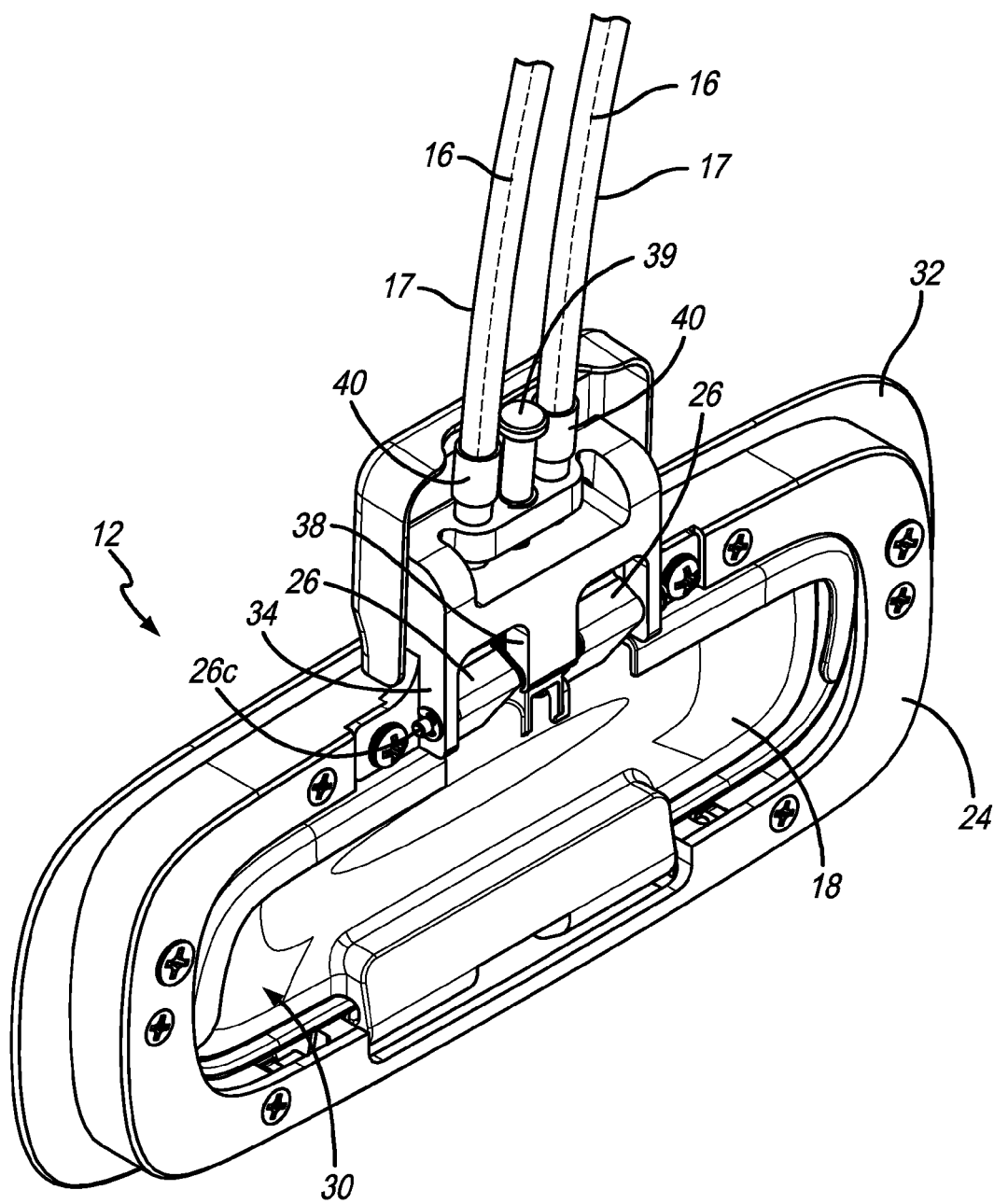
FIG. 4 is a perspective view of the paddle button assembly of the latch system of FIG. 1.
Figure 5A:
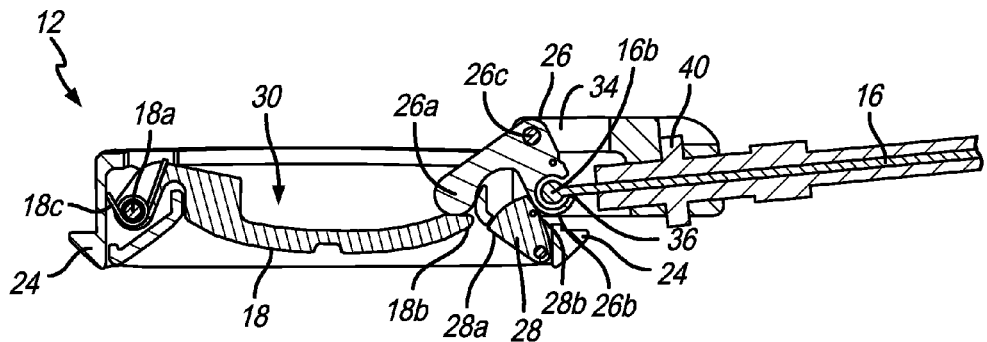
FIG. 5A is a cross-sectional view of the paddle button assembly with the button in the home position.
Figure 5B:
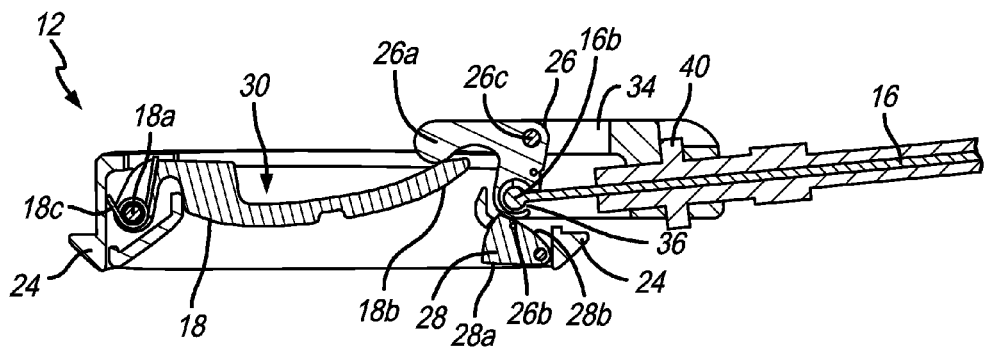
FIG. 5B is a cross-sectional view of the paddle button assembly with the button in the actuation position.

The paddle button assembly 12, which is best shown in FIGS. 4-5B, will now be described. Generally, the paddle button assembly 12 includes a frame 24, the button 18, first and second cam members 26, and an indicator 28 (described below). The frame 24 defines a central opening 30 that at least partially receives the button 18 and has an outer flange 32 that is mounted against the outside surface of the bucket 102. The button 18 is pivotally connected to the frame 24 (preferably by a pivot pin 18a that extends through associated openings in the frame 24 and button 18). The frame 24 also includes a hinge portion 34 that the cam members 26 are pivotally connected to. The hinge portion 34 can be integral with the frame 24 or a separate component.

As is best shown in FIGS. 5A-5B, in a preferred embodiment, the cam members 26 are generally "L" shaped and include a button engaging end 26a and a cable engaging end 26b. Preferably, the cable engaging end 26b includes an opening 36 that receives a ball 16b on the end of the cable 16. However any attachment of the cables 16 to the cable engaging ends 26b of the cam members 26 is within the scope of the present invention. The cam members 26 are preferably received in recesses 38 in the hinge portion 34 and are pivotal with respect to the hinge portion 34 (preferably by pivot pins 26c that extends through associated openings in the hinge portion 34 and button cam members 26).

As shown in FIG. 5A, the end 18b of the button 18 distal from the pivot point is engaged with the button engaging ends 26b of the cam members 26 (only one cam member is shown in FIG. 5A). FIG. 5A demonstrates the home position, which, as described below is associated with the engaged position of the first trigger arm and, ultimately, the closed position of the bin. To open the bin, a user pushes on button 18, which, pivots to the actuation position (shown in FIG. 5B). In a preferred embodiment, the button 18 is biased toward the home position. This can be done by a spring 18c. The distal end 18b of the button 18 pushes the button engaging ends 26a of the cam members 26, thereby pivoting the cam members 26 from a first position (shown in FIGS. 4 and 5A) to a second position (shown in FIG. 5B). The cam members 26 pulls the cables 16 (within casings 17), which ultimately disengages the hook assemblies 20 and the striker assemblies 22, which will be more fully described below. In another embodiment, the button 18 and cam member 26 are oriented to push the cable 16.

In a preferred embodiment, the cables 16 include the capability of being adjusted. This can be useful as the cables may stretch or lengthen over time. In a preferred embodiment, as shown in FIGS. 4-5B, the paddle button assembly 12 includes an adjustment lock 39 and adjustment nuts 40. The adjustment nuts 40 are similar to those used on bicycle brakes and or shifters. The adjustment lock 39 prevents the adjustment nuts 40 from turning when in the locked position and allows turning of the nuts (and, therefore, adjustment) when unlocked.

Figure 6:
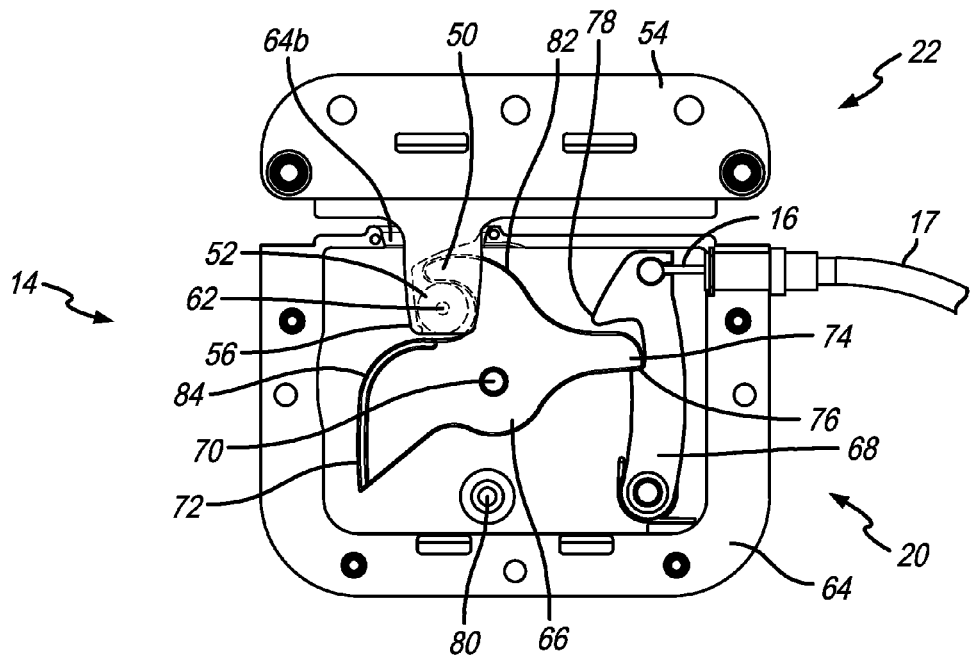
FIG. 6 is an elevational view of the latch assembly of the latch system of FIG. 1 with a portion of the housing removed and with the hook assembly and the striker assembly engaged with one another.
Figure 7:
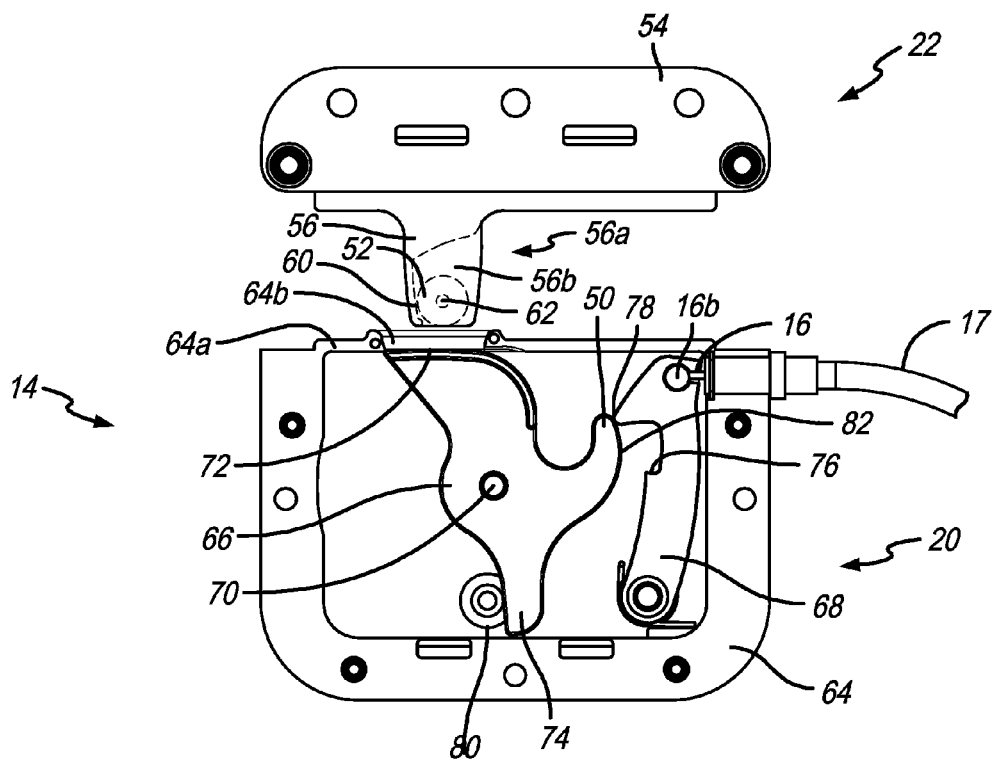
FIG. 7 is an elevational view of the latch assembly of the latch system of FIG. 1 with a portion of the housing removed and with the hook assembly and the striker assembly disengaged from one another.

The latch assemblies 14, one of which is shown in FIGS. 6 and 7, will now be described. Generally, the hook assembly 20 includes a hook 50 that engages a striker 52 on the striker assembly 22. When the hook 50 and striker 52 are engaged, the bucket is in the closed position. When the hook 50 and striker 52 are disengaged (by actuation of the button 18), the bucket moves to the open position.

As shown in FIGS. 6 and 7, in a preferred embodiment, the striker assembly 22 includes a casing 54 that is secured to the upper housing 104 and includes a striker housing 56 extending downwardly therefrom. The striker housing 56 defines a housing interior 58. The striker 52 comprises a bushing 60 that is rotatably received on a pin 62 that spans the housing interior. In a preferred embodiment, the striker housing 56 includes three sides, thereby defining a fourth side opening 56a that, together with the striker 52 defines a hook opening 56b into which the hook 50 is received.

In a preferred embodiment, the hook assembly 20 includes a housing 64 that defines a housing interior that houses the other components. In a preferred embodiment, the housing 64 is received in an opening in the side wall 110 of the bucket 102. The housing 64 includes a top wall 64a that has a striker opening 64b defined therein. Inside the housing 64, the hook assembly 20 includes a rotary member 66 and a pivotal trigger arm 68. The rotary member 66 is rotatably mounted on a pivot axle 70 and includes the hook 50 a closeout member 72 and a catch member 74. The rotary member 66 is rotatable between a first position (see FIG. 6) and a second position (see FIG. 7) and is biased toward the second position (preferably by a torsion spring that is concentric with the pivot pin). The trigger arm 68 is pivotally mounted to a pivot axle 70 and includes a ledge 76 and a ramp portion 78. The trigger arm is pivotal between an engaged position and a disengaged position and is biased toward the engaged position (preferably by a torsion spring that is concentric with the pivot pin).

As shown in FIG. 6, when the rotary member 66 is in the first position, the hook 50 is engaged with the striker 52 and the catch member 74 is engaged with the ledge 76 on the trigger arm 68. In this position, the hook 50 and striker 52 are engaged and the bucket is held in the closed position. When the cable 16 is pulled, as described above, the cable 16 pivots the trigger arm 68 to the disengaged position. In this position, the catch member 74 disengages from the ledge 76, and the rotary member 66 rotates to the second position (due to the bias). In a preferred embodiment, the catch member 74 engages a stop member 80, thereby preventing further rotation of the rotary member 66. As is shown in FIG. 7, when the rotary member 66 is in the second position, the closeout member 72 is aligned with the striker opening 64b in the top wall 64a of the housing 64. It will be understood that this serves two purposes. First, it prevents objects from entering the striker opening 64b. Second, it is part of the process for rotating the rotary member 66 back to the first position when the bucket is closed. In use, when the bucket is pivoted upwardly, the striker 52 enters the striker opening 64b and engages or contacts the closeout member 72. Because the closeout member 72 is offset from the pivot point of the rotary member 66, the engagement of the striker with the closeout member 72 causes the rotary member 66 to start to rotate toward the first position. The closeout member 72 includes a curved surface 84 that the striker 52 continues to push in to finish the rotation to the first position, thereby engaging the hook 50 with the striker 52.

As shown in FIGS. 5A-5B and FIGS. 8-9B, in a preferred embodiment, the paddle button assembly 12 includes an indicator 28 that is pivotally connected to the frame 24 (by a pivot pin) 29 and housed in an opening therein. The indicator 28 generally has a wedge shaped cross-section and is pivotal between a first position (see FIGS. 5A and 9A) where an outer surface 28a is flush with the outside surface of the flange 32 and a second position, where the side surfaces 28b are exposed. The indicator 28 is preferably biased toward the first position. The indicator 28 indicates when one or both of the hooks 50 are not engaged with the strikers 52.

Figure 8:
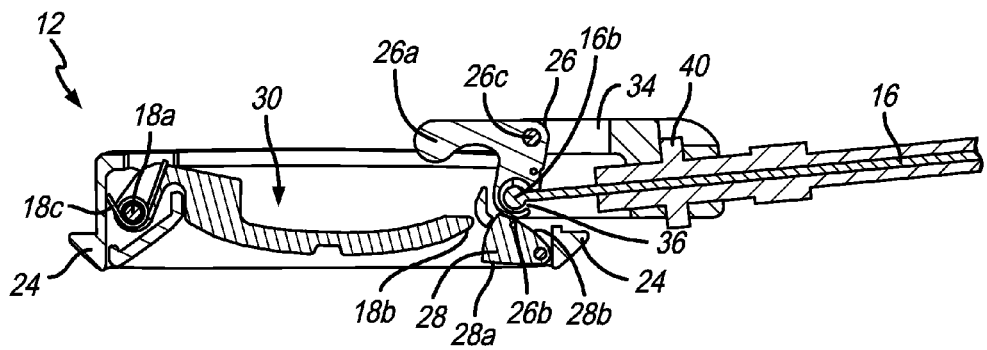
FIG. 8 is a cross-sectional view of the paddle button assembly with the indicator in the second position and the button in the home position.
Figure 9A:
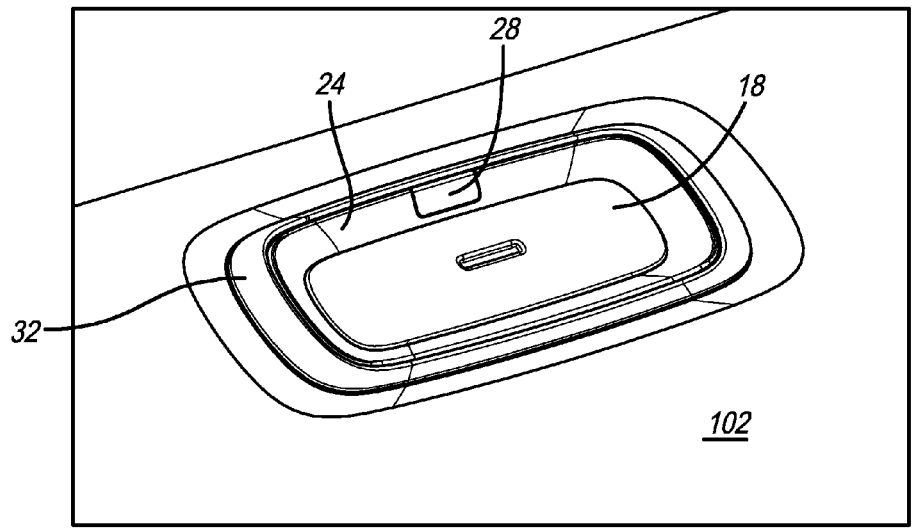
FIG. 9A is a perspective view of the paddle button assembly on the bucket with the indicator in the first position.
Figure 9B:
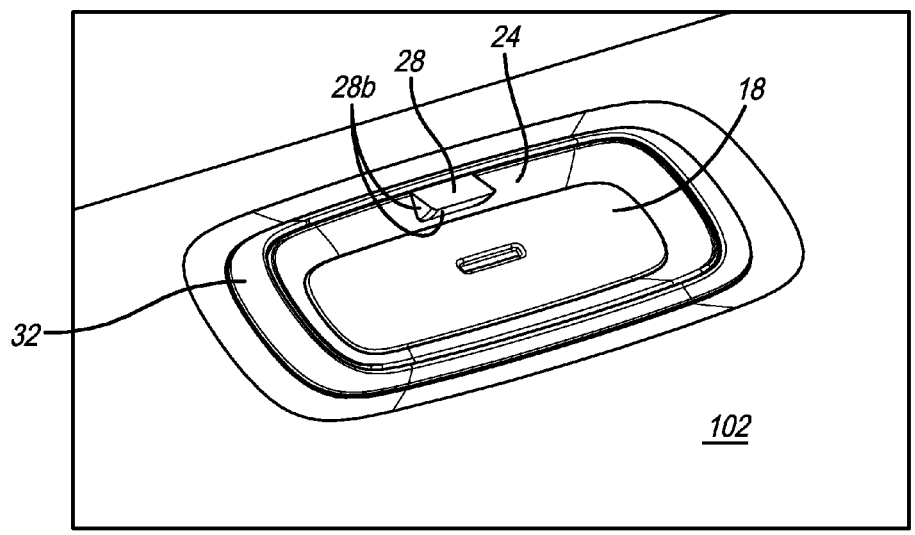
FIG. 9B is a perspective view of the paddle button assembly on the bucket with the indicator in the second (indication) position.

As shown in FIG. 5A, in the first position, the inner surface 28c of the indicator 28 is biased against both cable engaging ends 26b of the cam members 26. In use, when the button 18 is pivoted from the home position to the actuation position (as shown in FIG. 5B), the cam members 26 pivot and the cam engaging end 26b pivots the indicator 28 to the second position, thereby indicating that the hook 50 is not engaged with the striker 52. As is described above, when the cables 16 are pulled, the trigger arms 68 are pivoted from the engaged to the disengaged position, which causes the rotary members 66 to rotate from the first to the second position. It will be appreciated that as the rotary members 66 rotate to the second position, inclined surfaces 82 on the hooks 50 engage the ramp portions 78 of the trigger arms 68, which pivot the trigger arms 68 to the disengaged position and holds them there even after the button 18 has pivoted back to the home position. This action pushes the cables 16, which, in turn holds the cam members 26 and the indicator 28 in their respective second positions, as is shown in FIGS. 8 and 9B. During latching of the hooks 50 and strikers 52, when the trigger arms 68 are both moved to the engaged position, the cables 16 are pulled, thereby pivoting the cam members 26 and the indicator 28 to their respective first positions, as is shown in FIGS. 5A and 9A. It will be understood that if the bucket is closed improperly and only one of the first and second latch assemblies is latched (i.e., one of the strikers is not engaged with its hook), the cam member 26 associated with the unlatched latch assembly will hold the indicator in the second position, thereby indicating that something is wrong. In a preferred embodiment the side surfaces 28b of the indicator are a bright color. Therefore, when the bucket is in the closed position, but one of the latches is not properly latched a user (e.g., a flight attendant) will see that the indicator is in the position shown in FIG. 9B and can address the situation.

It will be appreciated that modifications can be made to the present invention. For example, the cable can be operably engaged with the hook and configured to pivot or rotate the hook to move the hook from a first to a second position and out of engagement with the striker. In this embodiment, the hook is biased toward the first position. To reengage the hook and striker, the hook includes an inclined surface thereon that is engaged by the striker to push the hook to the second position. Then after the striker clears the inclined surface the hook is biased back to the first position and into engagement with the striker. In this embodiment, the hook would act similar to the trigger arm in the current drawings. In the claims this embodiment may be covered by referring to the hook as a trigger arm. In another embodiment, the cable can be configured to pull or push the striker out of engagement with the hook. In another embodiment, the configuration of the button can be reversed so that the button is pulled to pivot and operate the cam members. In another embodiment, the cable is directly connected to the button so that pivoting the button pulls or pushes the cable to operate the latch. In another embodiment, the button is pushed in a linear direction to push the cable to operate the latch.

Figure 10:
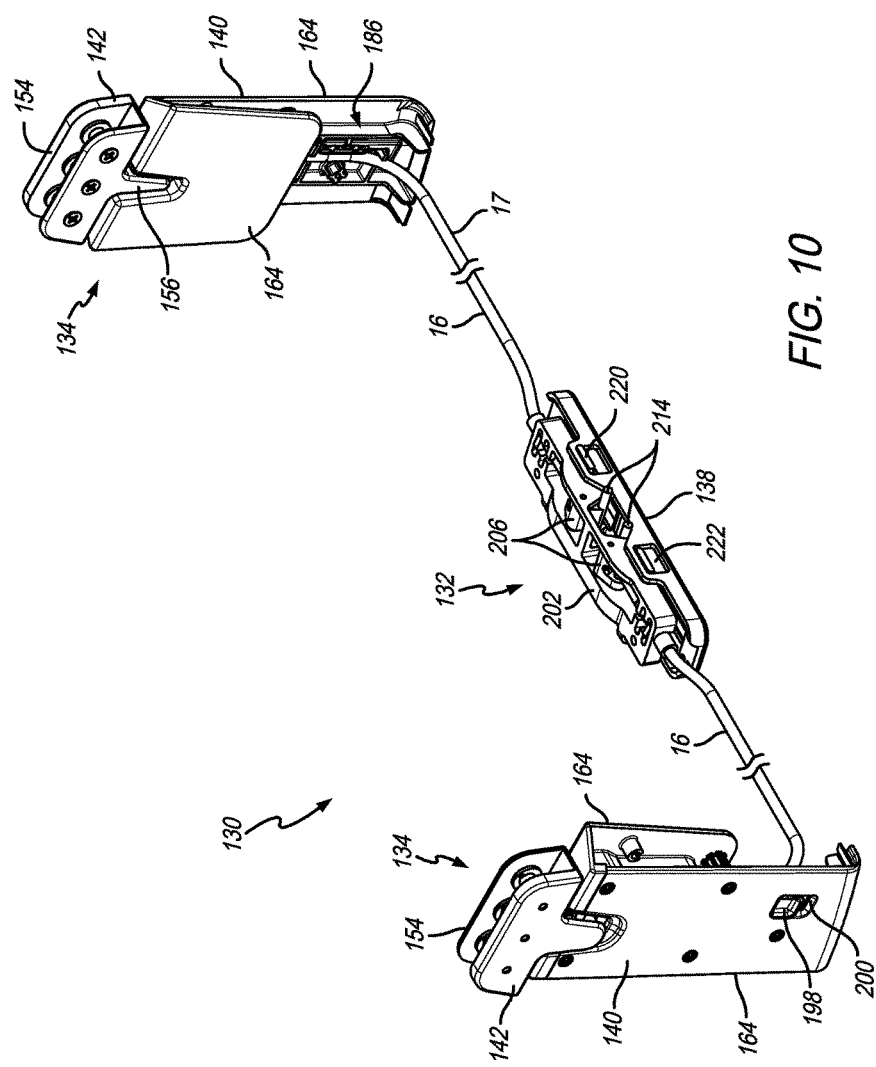
FIG. 10 is a perspective view of a latch system in accordance with another preferred embodiment of the present invention.

FIGS. 10-17 show another embodiment of a latch system 130. As shown in FIG. 10, generally, the latch system 130 includes a paddle button assembly 132, first and second latch assemblies 134 and first and second cables 16 extending between the paddle button assembly 132 and the first and second latch assemblies 134.

As shown in FIG. 10, the paddle button assembly 132 includes a button 138 that is movable between a home position and an actuation position (see FIGS. 14A and 14B), the first and second latch assemblies 134 includes a first hook assembly 140 and a first striker assembly 142, and the first and second cables 16 extend between the paddle button assembly 132 and the first and second latch assemblies 134.

Figure 11:
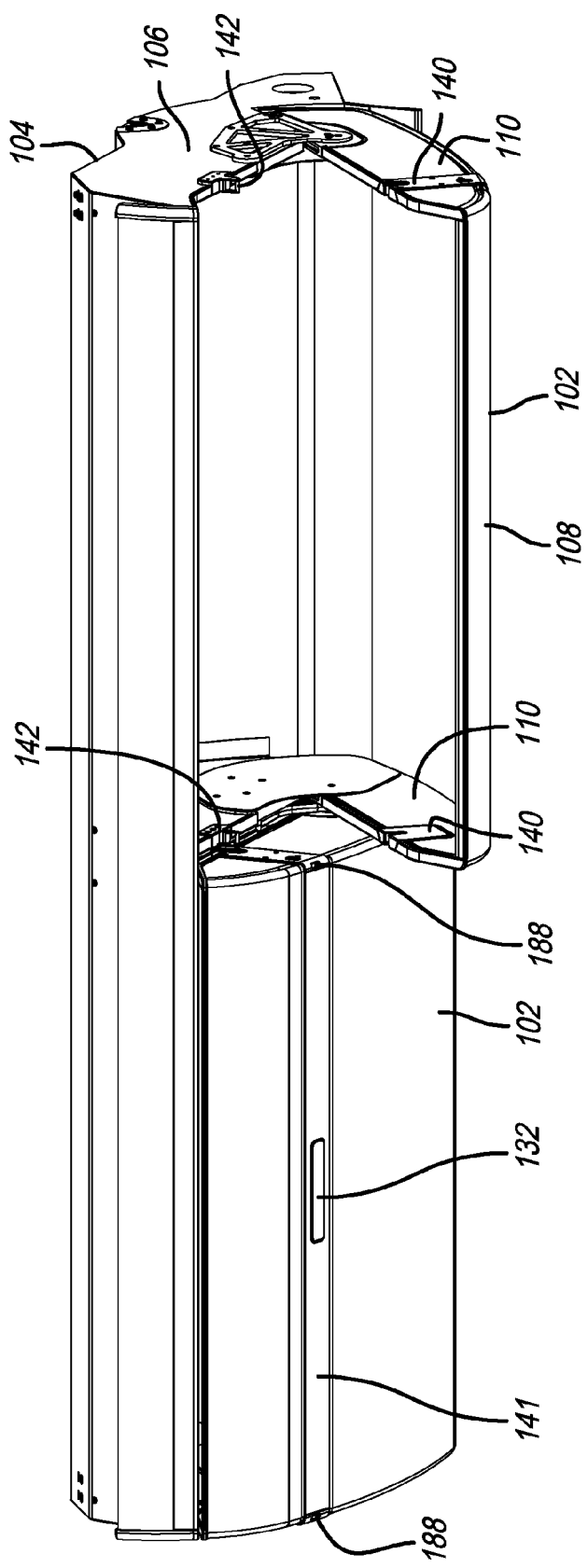
FIG. 11 is a perspective view of a dual pivot bin assembly with the latch system of FIG. 10 incorporated therein.

As shown in FIG. 11, in a preferred embodiment, the paddle button assembly 132 is associated with or mounted on or in the bucket 102. However, in another embodiment, the paddle button assembly 132 can be associated with or mounted on or in the upper housing. In a preferred embodiment, the first and second hook assemblies 140 are associated with one of the bucket 102 and the upper housing 104 and the first and second striker assemblies 142 are associated with the other of the bucket 102 and the upper housing 104. The drawings show the hook assemblies mounted in the side walls of the bucket and the striker assemblies mounted in and extending downwardly from the side panels of the upper housing. However, this arrangement can be reversed. In the embodiments shown in the drawings, the hook and striker assemblies are generally aligned with the side walls and side panels, which allows the clamshell type bin to close. However, in another embodiment, the hook and striker assemblies can be mounted on the inside or outside of the side walls or side panels. For example, if the latch system 130 was used with the pivot bin assembly taught in the '837 publication, the striker assemblies could be mounted on the inner surfaces the side panels of the stationary upper housing and the hook assemblies could be mounted on the outer surfaces of the side walls of the pivoting bin or vice versa.

Generally, movement of the button 138 from the home position (see FIG. 14A) to the actuation position (see FIG. 14B) moves the cables 16, thereby disengaging the hook assemblies 140 and the striker assemblies 142, and allowing the bucket to move from the closed position to the open position. This arrangement will be further described below.

As shown in FIG. 12, in a preferred embodiment, paddle button assembly 132 is mounted in an opening 112 defined in the bottom 108 of the bucket 102. The cables 16 extend through a channel 139 defined in the bottom 108 and sides 110 of the bucket 102. FIG. 12 shows the channel 139 extending along the outside bottom of the bucket away from the paddle button assembly 132. The channel 139 is preferably covered by a cover 141. The cables 16 extend in opposite directions from the paddle button assembly 132 and to the striker assemblies 142.

Figure 13:
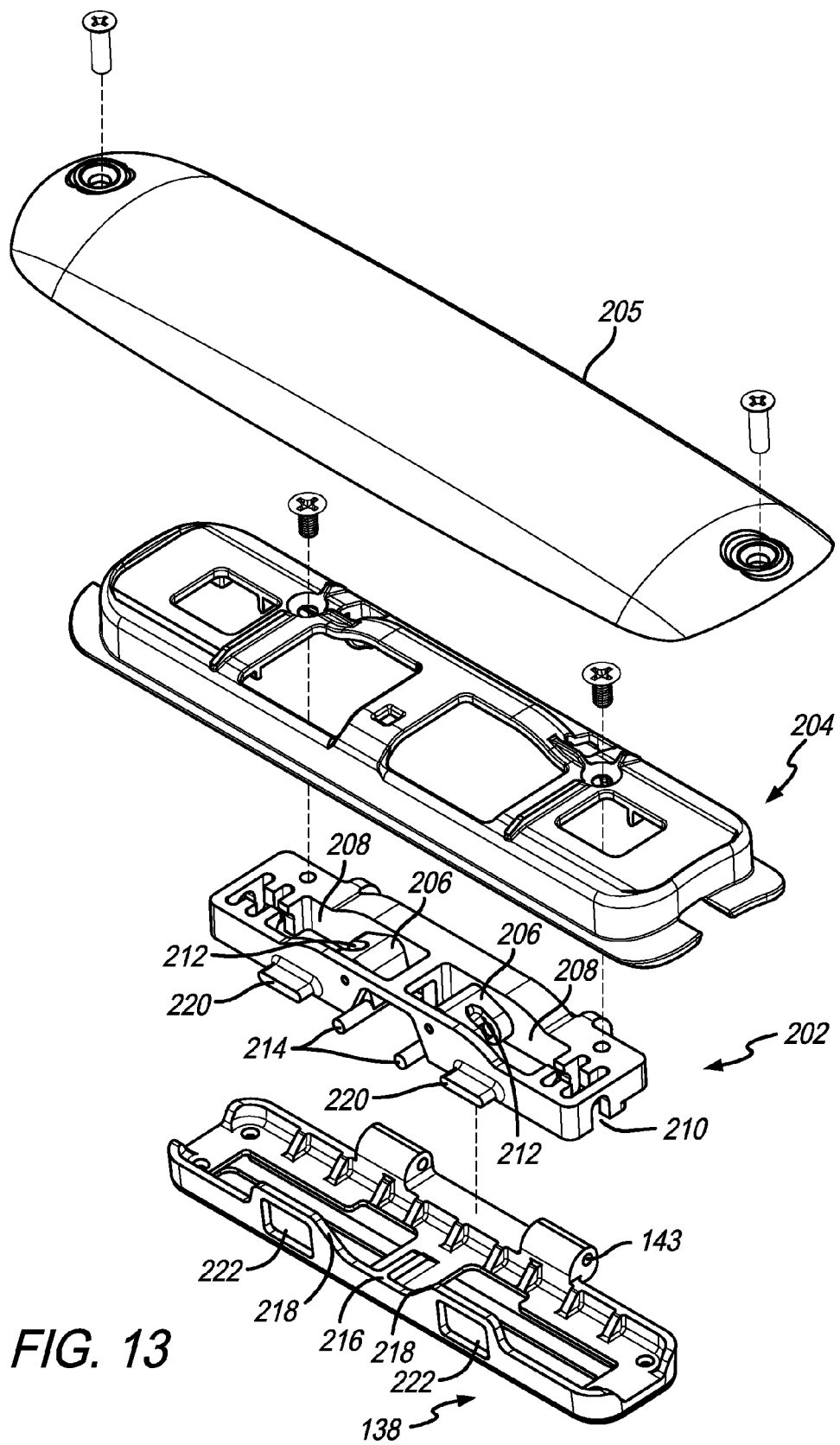
FIG. 13 is an exploded perspective view of the paddle button assembly of the latch system of FIG. 10.
Figure 14A:
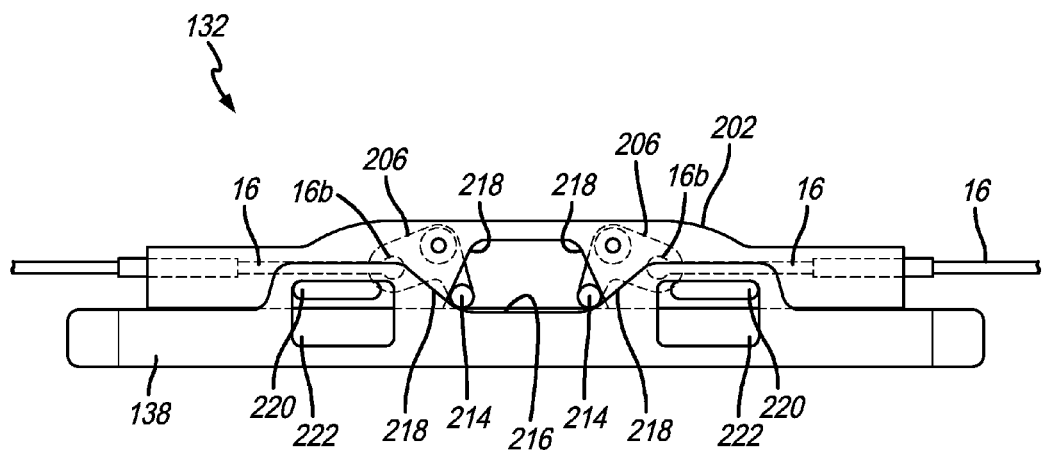
FIG. 14A is a front elevational view of the paddle button assembly with the button in the home position.
Figure 14B:
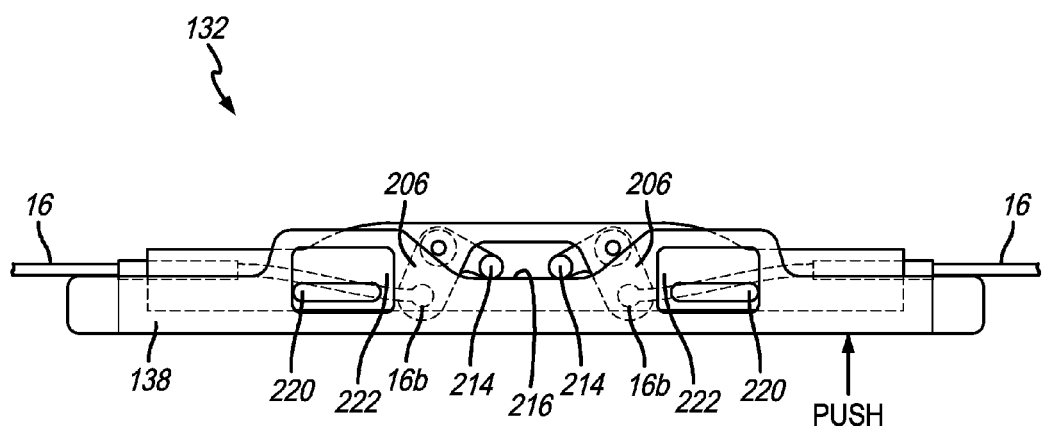
FIG. 14B is a front elevational view of the paddle button assembly with the button in the actuation position.

The paddle button assembly 132, which is best shown in FIGS. 13-14B, will now be described. Generally, the paddle button assembly 12 includes a frame 202, the button 138 and a casing 204 for attachment to the bucket 102. FIG. 13 also shows a cover 205 for covering the paddle button assembly 132 in the inside of the bucket. The frame 202 includes first and second cam levers or cam members 206 that pivot when the button 138 is pushed and that pull the cables 16. The button 138 is pivotally connected to the frame 202 (preferably by a pivot pin that extends through associated openings 143 in the frame 202 and button 138). The frame 202 includes channels 208 defined therein that receive the cam members 206 and in which the cam members 206 pivot. The cables 16 (not shown in FIG. 13) extend through openings 210 in the end of the frame 202. Balls 16b on the end of the cables 16 are received in an opening 212 in the cam members 206. The cam members 206 each include a cam post 214 extending outwardly therefrom. The cam posts 214 engage with a cam surface 216 on the button 138.

FIG. 14A demonstrates the home position, which, as described below is associated with the engaged position of the first trigger arm and, ultimately, the closed position of the bin. To open the bin, a user pushes on button 138, which, pivots to the actuation position (shown in FIG. 14B). In a preferred embodiment, the button 138 is biased toward the home position. This can be done by a spring. As a result of the configuration of the cam surface 216 and the cam posts 214, movement of the button 138 causes the cam posts 214 to move upwardly and inwardly on the cam surface 216 (as oriented in FIGS. 14A and 14B). This movement causes the cam members 206 to pivot from a first position (shown in FIG. 14A) to a second position (shown in FIG. 14B). The cam members 206 pull the cables 16 (within casings 17), which ultimately disengages the hook assemblies 140 and the striker assemblies 142, which will be more fully described below. In another embodiment, the button 138 and cam member 206 are oriented to push the cable 16. It will be appreciated that the frame 202 and the button 138 each include inclined surfaces 218 that maintain the cam posts 214 in the desired position prior to and during operation.

In a preferred embodiment, the frame also includes stoppers 220 that cooperate with windows 222 in the button 138. The inner upper edge of the windows 222 contact the stoppers 220 in the first position to maintain the button 138 in the first or rest position. Similar to the first embodiment described herein, the cables can include the capability of being adjusted.

Figure 15:
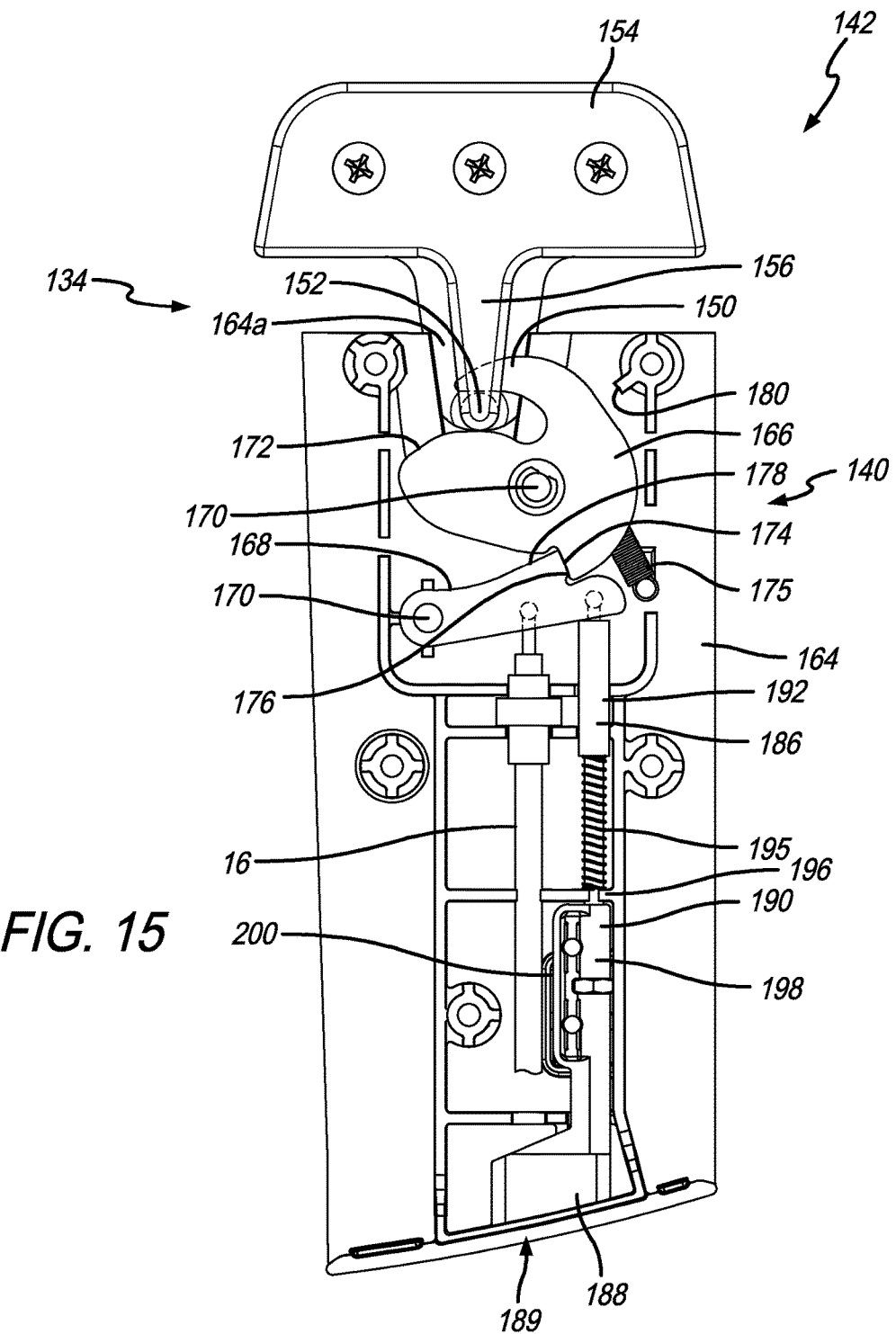
FIG. 15 is a perspective view of the latch assembly of the latch system of FIG. 10 with a portion of the housing removed, with the hook assembly and the striker assembly engaged with one another and the indicator and manual override switch in the first position.
Figure 16:
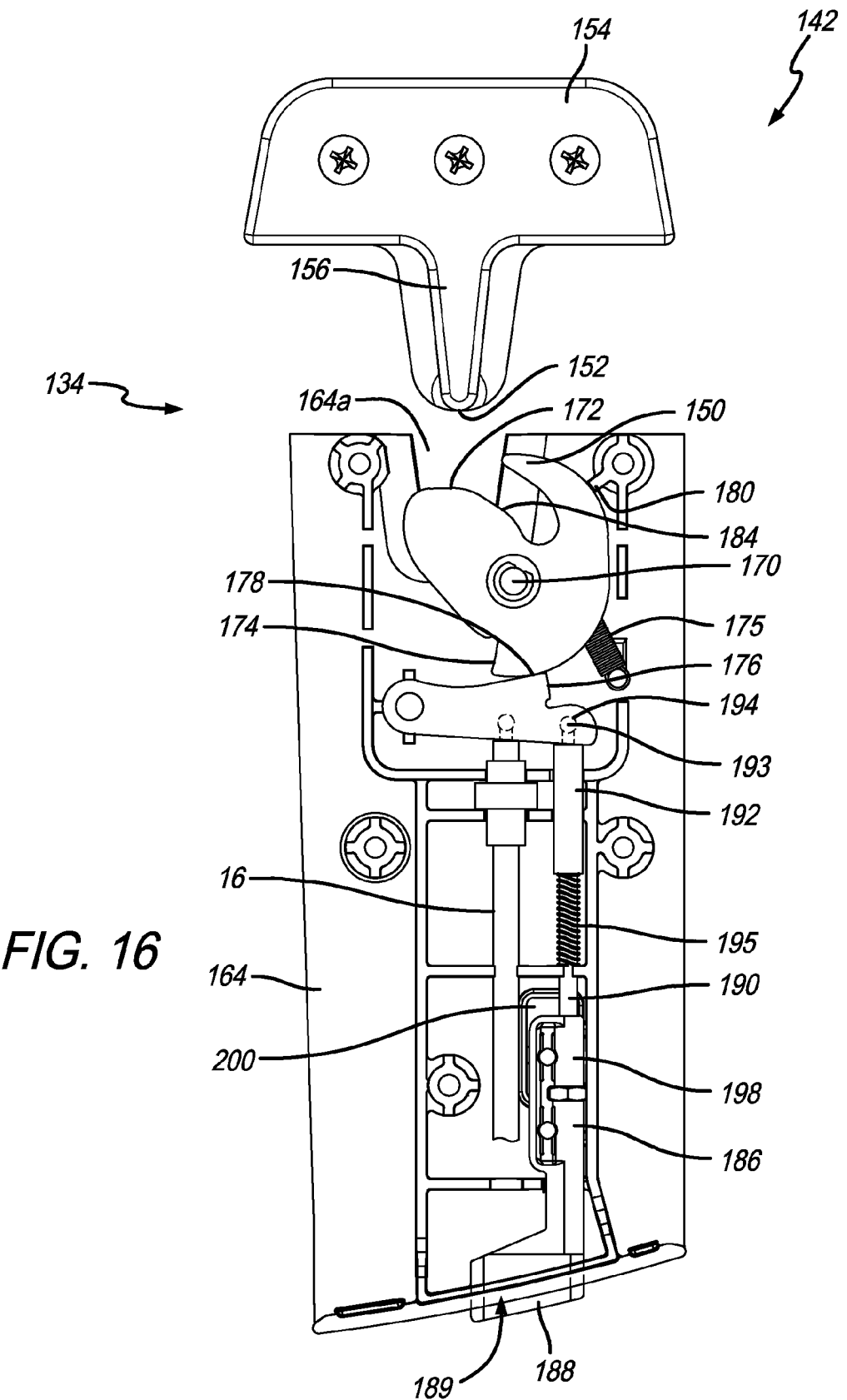
FIG. 16 is a perspective view of the latch assembly of the latch system of FIG. 10 with a portion of the housing removed, with the hook assembly and the striker assembly disengaged from one another and the indicator and manual override switch in the second position.
Figure 17:
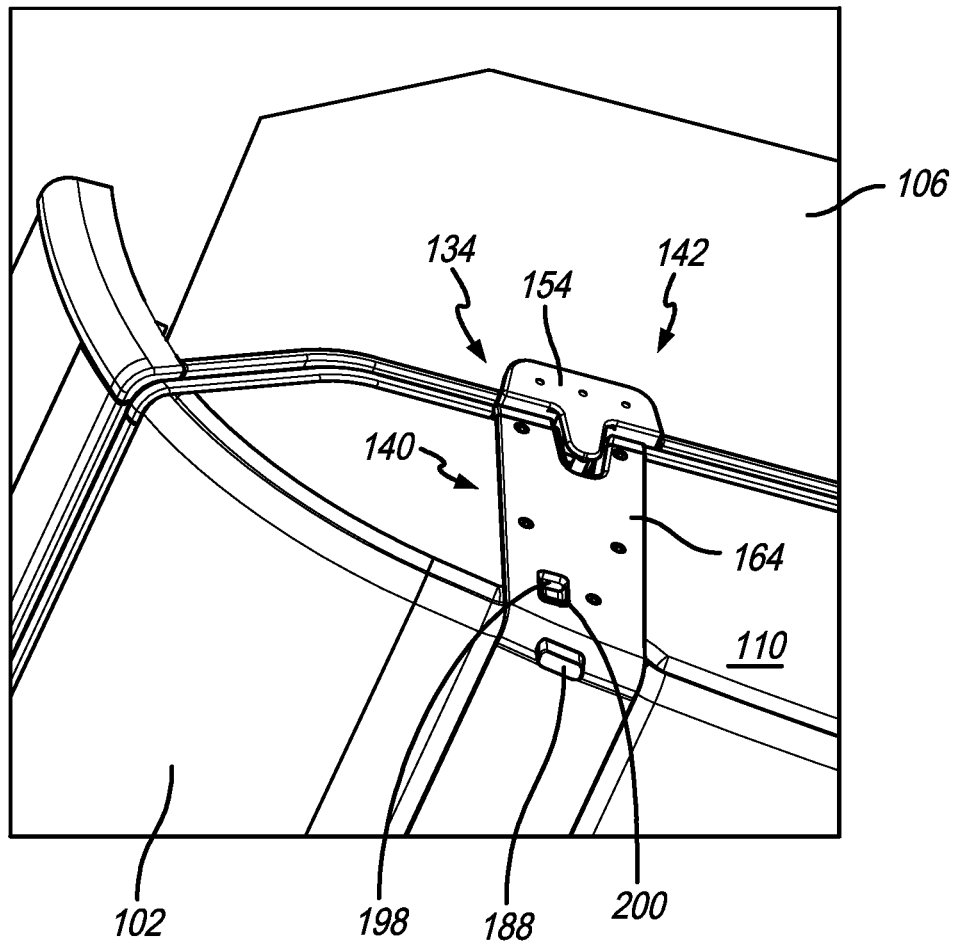
FIG. 17 is a perspective view showing the indicator and manual override switch in the second (indication) position.

The latch assemblies 134, one of which is shown in FIGS. 15-17, will now be described. Generally, the hook assembly 140 includes a hook 150 that engages a striker 152 on the striker assembly 142. When the hook 150 and striker 152 are engaged, the bucket is in the closed position. When the hook 150 and striker 152 are disengaged (by actuation of the button 138), the bucket moves to the open position.

In a preferred embodiment, the striker assembly 142 includes a casing 154 that is secured to the upper housing 104 and includes a striker housing 156 extending downwardly therefrom. The striker 152 is associated with and secured in the striker housing 156.

In a preferred embodiment, the hook assembly 140 includes a housing 164 that defines a housing interior that houses the other components. In a preferred embodiment, the housing 164 is received in an opening or indentation in the side wall 110 of the bucket 102 (see FIG. 17). The housing can include two sides that together house the hook 150 and associated components or a single side that cooperates with the side wall 110 of the bucket 102 to house the hook 150 and associated components. The housing 164 includes a striker opening 164a defined therein. Inside the housing 164, the hook assembly 140 includes a rotary member 166 and a pivotal trigger arm 168. The rotary member 166 is rotatably mounted on a pivot axle 170 and includes the hook 150, a closeout member 172 and a catch member 174. The rotary member 166 is rotatable between a first position (see FIG. 15) and a second position (see FIG. 16) and is biased toward the second position by a spring 175 (a torsion spring that is concentric with the pivot pin can also be used). The trigger arm 168 is pivotally mounted to a pivot axle 170 and includes a ledge 176 and a ramp portion 178. The trigger arm 168 is pivotal between an engaged position and a disengaged position and is biased toward the engaged position (preferably by a torsion spring that is concentric with the pivot pin or by the indicator assembly 186, described below).

As shown in FIG. 15, when the rotary member 166 is in the first position, the hook 150 is engaged with the striker 152 and the catch member 174 is engaged with the ledge 176 on the trigger arm 168. In this position, the hook 150 and striker 152 are engaged and the bucket is held in the closed position. When the cable 16 is pulled, as described above, the cable 16 pivots the trigger arm 168 downwardly to the disengaged position. In this position, the catch member 174 disengages from the ledge 176, and the rotary member 166 rotates to the second position (due to the bias by spring 175). In a preferred embodiment, in the second position, the rotary member 166 engages a stop member 180, thereby preventing further rotation of the rotary member 166. As is shown in FIG. 16, when the rotary member 166 is in the second position, the closeout member 172 is aligned with or positioned to close the striker opening 164a in the housing 164. It will be understood that this serves two purposes. First, it prevents objects from entering the housing. Second, it is part of the process for rotating the rotary member 166 back to the first position when the bucket is closed. In use, when the bucket is pivoted upwardly, the striker 152 enters the striker opening 164a and engages or contacts the closeout member 172. Because the closeout member 172 is offset from the pivot point of the rotary member 166, the engagement of the striker with the closeout member 172 causes the rotary member 166 to start to rotate toward the first position. The closeout member 172 includes a curved surface 184 that the striker 152 continues to push in to finish the rotation to the first position, thereby engaging the hook 150 with the striker 152.

As shown in FIGS. 15-16, in a preferred embodiment, the hook assembly 140 includes an indicator assembly 186 that is operatively connected to the trigger arm 168. The indicator assembly 186 includes an indicator 188 that extends through an opening 189 in the bottom of the housing 164, an arm 190 and a plunger 192 that includes a ball 193 on the end thereof that is received in a socket 194 defined in the trigger arm 168. Preferably, the arm 190 includes a spring 195 thereon that extends between the plunger 192 and a baffle 196 in the housing 164. The spring 195 biases the trigger arm 168 upwardly and the indicator 188 to a first position.

As shown in FIG. 15, when the trigger arm 168 is in the engaged position (equivalent to the hook being engaged with or latched to the striker), the indicator 188 is in the first position, thereby indicating that the hook 150 is engaged with the striker. In this position, the bottom surface of the indicator 188 is generally flush with the bottom of the housing 164. As shown in FIGS. 16 and 17, when the trigger arm 168 is in the disengaged position (equivalent to the hook being disengaged or unlatched from the striker), the trigger arm 168 pushes the plunger 192, arm 190 and indicator 188 downwardly and into a second position, thereby indicating that the hook 150 is disengaged from the striker. In this position, the indicator 188 extends downwardly through opening 189 so that it is visible to passengers or crew. Preferably, the indicator is colored red (or other color) to provide greater visibility. The indicator 188 can also include a light.

As shown in FIGS. 15-17, in a preferred embodiment, the indicator assembly 186 also includes a manual override switch or member 198 that is positioned in and movable within a switch opening 200 in the housing 164. FIGS. 15-16 show the back side of the switch and FIG. 17 shows the front side. The manual override switch 198 is used if the bucket will not open using the button 138 (i.e., when moving the button does not cause the hook assembly to disengage from the striker assembly). In use, the manual override switch is moved from a first position (FIG. 15) to a second position (FIGS. 16 and 17) (e.g., it is moved generally downwardly), which pulls and pivots the trigger arm 68 to the disengaged position. In this position, the catch member 174 disengages from the ledge 176, and the rotary member 166 rotates to the second position (due to the bias), thereby disengaging the hook 150 from the striker 152. In another embodiment, the indicator can be omitted. In this embodiment, the indicator assembly is also referred to as an override assembly.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft storage bin latch system comprising:
   a paddle button assembly that includes a button that is movable between a home position and an actuation position,
   a latch assembly that includes a striker assembly and a hook assembly, wherein the hook assembly includes a hook, a trigger arm pivotal from an engaged position to a disengaged position, and an indicator that is movable from a first position to a second position when the trigger arm is moved from the engaged position to the disengaged position, wherein the striker assembly includes a striker, and
   a cable that extends between the paddle button assembly and the latch assembly, wherein movement of the button from the home position to the actuation position pushes or pulls the cable, thereby pivoting the trigger arm from the engaged position to the disengaged position and disengaging the hook from the striker, wherein pivotal movement of the trigger arm from the engaged position to the disengaged position results in linear movement of the indicator from the first position to the second position.

2. The aircraft storage bin latch system of claim 1 wherein the button is pivotal between the home position and the actuation position, and wherein the pivoting of the button pushes or pulls the cable, thereby disengaging the hook assembly and the striker assembly.

3. The aircraft storage bin latch system of claim 1 wherein the hook assembly includes a rotary member that includes the hook, wherein the rotary member is movable between a first position where the hook is engaged with the striker and a second position where the hook is not engaged with the striker.

4. The aircraft storage bin latch system of claim 3 wherein the rotary member is biased toward the second position.

5. The aircraft storage bin latch system of claim 4 wherein the rotary member includes a catch member that engages a ledge on the trigger arm in the first position.

6. The aircraft storage bin latch system of claim 3 wherein the rotary member is enclosed in a housing that includes a top wall, wherein the rotary member includes a closeout member, wherein the housing includes a striker opening defined in the top wall of the housing, and wherein the closeout member is positioned to block the striker opening when the rotary member is in the second position.

7. The aircraft storage bin latch system of claim 1 wherein the indicator has an outer surface and is enclosed in a housing having an outer surface, and wherein the outer surface of the indicator is substantially flush with the outer surface of the housing when the indicator is in the first position, and wherein the outer surface of the indicator extends outwardly from the housing when the indicator is in the second position.

8. The aircraft storage bin latch system of claim 1 wherein the button is pivotal between the home position and the actuation position, wherein the paddle button assembly includes a cam member, and wherein pivoting of the button pivots the cam member and pushes or pulls the cable, thereby disengaging the hook from the striker.

9. The aircraft storage bin latch system of claim 8 wherein the cam member includes a cam post extending outwardly that engages a cam surface on the button, and wherein the cam post moves along the cam surface when the button pivots from the home position to the actuation position.

10. The latch system of claim 1 wherein the hook assembly includes a rotary member that includes the hook, wherein the rotary member is movable between a first position where the hook is engaged with the striker and a second position where the hook is not engaged with the striker, wherein the rotary member includes a closeout member, and wherein the closeout member is positioned to block a striker opening when the rotary member is in the second position.

11. An aircraft storage bin that comprises:
   an upper housing that includes first and second side panels,
   a bucket that cooperates with the upper housing to define a bin interior, wherein the bucket is movable with respect to the upper housing between an open position and a closed position, wherein the bucket includes a bottom and first and second side walls, and
   a latch system that includes a paddle button assembly having a button that is movable between a home position and an actuation position, a latch assembly that includes a hook assembly and a striker assembly, and a cable that extends between the paddle button assembly and the latch assembly, wherein the hook assembly includes a hook, a trigger arm pivotal from an engaged position to a disengaged position, and a manual override switch that is movable in a linear direction from a first position to a second position, and wherein the striker assembly includes a striker, wherein the paddle button assembly is associated with one of the bucket and the upper housing, wherein the hook assembly is associated with one of the bucket and the upper housing and the striker assembly is associated with the other of the bucket and the upper housing, wherein movement of the button from the home position to the actuation position moves the cable and pivots the trigger arm, thereby disengaging the hook assembly and the striker assembly, whereby the bucket moves from the closed position to the open position, and wherein linear movement of the manual override switch from the first position to the second position pivots the trigger arm, thereby disengaging the hook assembly and the striker assembly, and wherein the hook assembly includes an indicator that is movable in a linear direction from a first position to a second position when the trigger arm is pivoted from the engaged position to the disengaged position.

12. The aircraft storage bin of claim 11 wherein the hook assembly includes a rotary member that includes the hook, wherein the rotary member is movable between a first position where the hook is engaged with the striker and a second position where the hook is not engaged with the striker.

13. The aircraft storage bin of claim 12 wherein the rotary member is biased toward the second position.

14. The aircraft storage bin of claim 13 wherein the rotary member includes a catch member that engages a ledge on the trigger arm in the first position and a stop member in the second position.

15. The aircraft storage bin of claim 12 wherein the rotary member is enclosed in a housing that includes a top wall, wherein the rotary member and includes a closeout member, wherein the housing includes a striker opening defined in the top wall of the housing, and wherein the closeout member is positioned to block the striker opening when the rotary catch is in the second position.

16. The latch system of claim 11 wherein the indicator is enclosed in a housing, wherein the indicator extends outwardly from a first opening in the housing when in the second position, and wherein the manual override switch is accessible through a second opening in the housing.

17. The latch system of claim 11 wherein the button is pivotal between the home position and the actuation position, wherein the paddle button assembly includes a cam member, and wherein pivoting of the button pivots the cam member and pushes or pulls the cable, thereby disengaging the hook from the striker.

18. The latch system of claim 17 wherein the cam member includes a cam post extending outwardly that engages a cam surface on the button, and wherein the cam post moves along the cam surface when the button pivots from the home position to the actuation position.

19. The latch system of claim 11 wherein the hook assembly includes rotary member that includes the hook, wherein the rotary member is movable between a first position where the hook is engaged with the striker and a second position where the hook is not engaged with the striker, wherein the rotary member includes a closeout member, and wherein the closeout member is positioned to block a striker opening when the rotary member is in the second position.

* * * * *